United States Patent
Shaswat et al.

(10) Patent No.: US 12,093,902 B2
(45) Date of Patent: Sep. 17, 2024

(54) ENHANCED IDENTIFICATION AND MANAGEMENT OF CABLE NETWORK OUTAGES

(71) Applicant: Cox Communications, Inc., Atlanta, GA (US)

(72) Inventors: Amrit Shaswat, Atlanta, GA (US); Brian Stublin, Atlanta, GA (US); Sarah Lau, Atlanta, GA (US); Brad Demerich, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 224 days.

(21) Appl. No.: 17/388,375

(22) Filed: Jul. 29, 2021

(65) Prior Publication Data
US 2023/0032163 A1 Feb. 2, 2023

(51) Int. Cl.
*G06Q 10/20* (2023.01)
*G06N 20/20* (2019.01)
(Continued)

(52) U.S. Cl.
CPC .............. *G06Q 10/20* (2013.01); *G06N 20/20* (2019.01); *G06Q 10/0639* (2013.01); *H04L 67/10* (2013.01)

(58) Field of Classification Search
None
See application file for complete search history.

(56) References Cited

U.S. PATENT DOCUMENTS 8,042,171 B1 * 10/2011 Nordstrom .......... H04L 63/1441
726/13
9,297,723 B1 * 3/2016 Hofmann ................ G06N 20/00
(Continued)

FOREIGN PATENT DOCUMENTS

EP    1257089 A2 * 11/2002 ............. H04L 12/24
EP    3716456 A1 *  3/2020 ............. H02M 1/00
(Continued)

OTHER PUBLICATIONS

Jin, Yu, et al. "Nevermind, the problem is already fixed: proactively detecting and troubleshooting customer dsl problems." Proceedings of the 6th International Conference. 2010. (Year: 2010).*
(Continued)

*Primary Examiner* — Paul R Fisher
(74) *Attorney, Agent, or Firm* — Eversheds Sutherland (US) LLP

(57) ABSTRACT

This disclosure describes systems, methods, and devices related to network outage management. A method may include receiving, by a cloud-based system, a first indication of a first cable system outage; instantiating, by the cloud-based system, a first computing instance associated with generating event data indicative of the first cable system outage; instantiating, by the cloud-based system, a second computing instance associated with a machine learning model; generating, by the cloud-based system, using the event data as inputs to the machine learning model, a score indicative of a probability that the first cable system outage is repairable by a technician; and refrain from sending, by the cloud-based system, based on a comparison of the score to a score threshold, the event data to a first system associated with repairing the first cable system outage.

20 Claims, 8 Drawing Sheets

(51) Int. Cl.
*G06Q 10/0639* (2023.01)
*H04L 67/10* (2022.01)

(56) References Cited

U.S. PATENT DOCUMENTS

| | | | | |
|---|---|---|---|---|
| 10,740,169 | B1* | 8/2020 | Passaretti | G06F 11/0709 |
| 11,144,835 | B2* | 10/2021 | Anagnostou | G06Q 10/04 |
| 11,432,170 | B1* | 8/2022 | Osinski | H04W 24/02 |
| 2004/0061616 | A1* | 4/2004 | Fischer | H02J 13/00016 |
| | | | | 340/657 |
| 2010/0111288 | A1* | 5/2010 | Afzal | H04M 3/5232 |
| | | | | 379/265.14 |
| 2011/0138064 | A1* | 6/2011 | Rieger | G06F 16/9577 |
| | | | | 707/715 |
| 2011/0275364 | A1* | 11/2011 | Austin | H04L 41/06 |
| | | | | 455/423 |
| 2012/0306895 | A1* | 12/2012 | Faulkner | H04B 3/46 |
| | | | | 379/27.01 |
| 2014/0237107 | A1* | 8/2014 | Ince | H04L 69/40 |
| | | | | 709/224 |
| 2015/0358218 | A1* | 12/2015 | Nasir | H04L 41/0803 |
| | | | | 709/224 |
| 2017/0024271 | A1* | 1/2017 | Teli | G06Q 10/20 |
| 2017/0366983 | A1* | 12/2017 | Gunasekara | H04L 43/0811 |
| 2018/0239658 | A1* | 8/2018 | Whitner | G06F 11/3409 |
| 2019/0019197 | A1* | 1/2019 | Roberts | G06Q 10/067 |
| 2019/0108419 | A1* | 4/2019 | Coven | G06F 8/60 |
| 2019/0149480 | A1* | 5/2019 | Singhvi | H04L 47/2483 |
| | | | | 709/226 |
| 2020/0104401 | A1* | 4/2020 | Burnett | G06F 16/287 |
| 2020/0184591 | A1* | 6/2020 | Balu | G06Q 50/40 |
| 2020/0320638 | A1* | 10/2020 | Erickson | G06N 20/00 |
| 2022/0190940 | A1* | 6/2022 | Zaifman | H04B 17/26 |

FOREIGN PATENT DOCUMENTS

| | | | | |
|---|---|---|---|---|
| WO | WO2015017836 | A2 * | 2/2015 | G06Q 10/08 |
| WO | WO2015069262 | A1 * | 5/2015 | H04M 11/06 |
| WO | WO2015112892 | A1 * | 7/2015 | G06Q 50/26 |

OTHER PUBLICATIONS

R. A. P. Rajan, "Serverless Architecture—A Revolution in Cloud Computing, " 2018 Tenth International Conference on Advanced Computing (ICoAC), Chennai, India, 2018, pp. 88-93, doi: 10.1109/ICoAC44903.2018.8939081. (Year: 2018).*

D. Bardsley, L. Ryan and J. Howard, "Serverless Performance and Optimization Strategies," 2018 IEEE International Conference on Smart Cloud (SmartCloud), New York, NY, USA, 2018, pp. 19-26, doi: 10.1109/SmartCloud.2018.00012. (Year: 2018).*

* cited by examiner

US 12,093,902 B2

ENHANCED IDENTIFICATION AND MANAGEMENT OF CABLE NETWORK OUTAGES

TECHNICAL FIELD

This disclosure generally relates to devices, systems, and methods for identification and management of cable network outages.

BACKGROUND

Service providers, such as multiple-system operators, may monitor service performance to identify performance issues. For example, poor service performance may indicate a service outage that may undermine customer's experience and the operation of devices. Identifying and responding to service performance issues may be inefficient for some systems.

Figure 1:
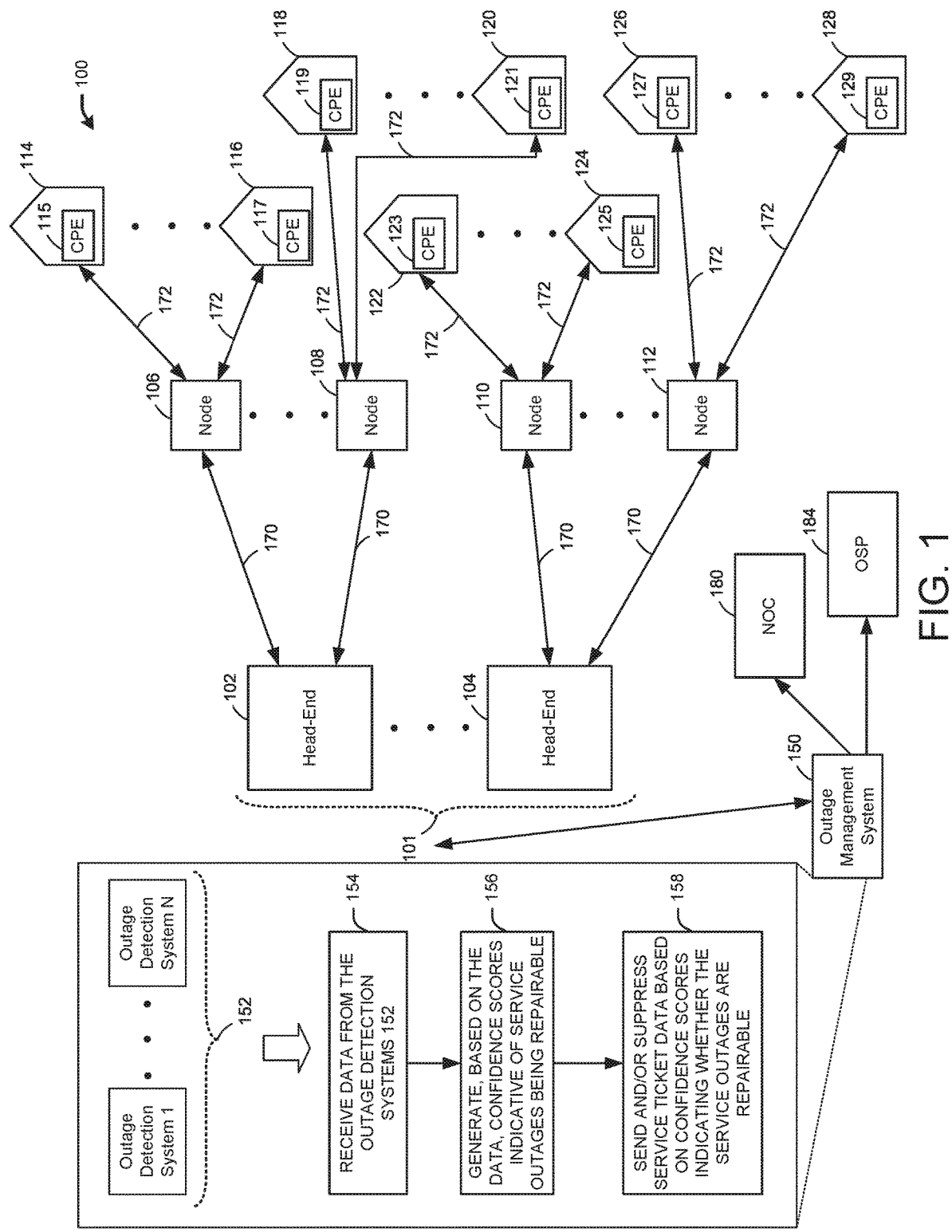
FIG. 1 illustrates an example system for network outage management, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for network outage management. The following description and the drawings suffi- ciently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Multiple-system operators (MSOs) operate multiple customer services, such as broadband and television. Some MSOs may use a variety of systems to deliver services, such as optical networks, networks using the Data Over Cable Service Interface Specification (DOCSIS), and the like.

Cable system events may require a human technician to review, analyze, diagnose, and rectify performance problems. For example, a technician may determine whether a cable system performance issue is related to an event (e.g., a power outage), or whether the issue may be addressed and rectified. When a cable system issue is detected or reported, a service ticket may be generated to document the issue, and a technician may respond to the service ticket. When a ticket is created, the time spent for an agent to route the ticket to a technician may result in the ticket becoming "stale" (e.g., outdated), sometimes resulting in future network impairments. Therefore, some service tickets may indicate service impairments that are not actionable, and some service tickets may not be acted upon in a timely manner.

System outages may occur at many locations. For example, an outage may be system-wide, market-wide, or at the node level. In particular, service providers may provide service to a variety of customer premises equipment (CPE), where many CPE (e.g., the one or more CPE of 500 customers) may be in communication with a respective node, and a system may include many nodes. For example, a node may provide service to all the CPE of a neighborhood. Fiber optics and other connections may deliver data to a node, and coaxial cable or other connections may deliver the data the "last mile" from the node to the CPE. Most system outages may occur at the node level.

Because the different outage detection models may detect varying data anomalies at different nodes, sometimes service outages affecting different CPE serviced by one node or across multiple nodes may be related. For example, a service outage that affects CPE serviced by multiple nodes may result in the detection of related outages for the multiple nodes and CPE, and sometimes a service outage that affects CPE serviced by one node may be unrelated to a service outage that affects CPE serviced by another node.

When an outage is detected by an outage detection model, a system may generate a service ticket to investigate and/or repair the devices experiencing the service outage. In a system with many nodes and CPE, and multiple outage detection models to detect the different types of service outages that may occur, some generated service tickets may indicate outage events that may be related to the same performance problem. As a result, many service tickets may be generated to address the same problem, resulting in an inefficient use of automated and manual resources. In addition, some service tickets may identify the same outages, outages that are caused by planned events (e.g., planned shutdowns that do not require service technician repairs), or outages that cannot be fixed by a cable service technician (e.g., a network outage caused by a power outage).

There is therefore a need for improved identification and management of cable network outages.

In one or more embodiments, the identification of actionable service tickets (e.g., service tickets indicating cable system performance impairments that may be fixed by a cable service provider) may be improved, reducing the overall volume of generated service tickets by reducing the number of service tickets that indicate non-actionable service impairments (e.g., those caused by a power outage or something that a cable service provider may not control). Technical benefits of the present disclosure are the improvement of the way that a computer-based system analyzes cable service performance data to detect actionable and non-actionable cable service events, and the way that a computer-based system generates service tickets to manage technician resources by increasing the likelihood of a service technician being deployed to an actionable event. In this manner, the analysis of cable system performance data and generation of cable system service tickets may provide a practical application of cable system performance analysis and response to the context of improved cable network performance and management of cable network resources (e.g., using DOCSIS networks). In particular, the use of serverless computing and machine learning, as described further herein, may improve the speed and accuracy with which computer-based systems identify and respond to cable system events, resulting in a more efficient use of computer resources and management of human and other computer resources.

In one or more embodiments, a cable system may include an outage stream management component to analyze and respond to cable system performance data. The outage stream management component may be cloud-based, and may include one or multiple computing instances (e.g., event-based serverless computing instances that execute computer code without provisioning or managing a server). The cloud-based system may include a real-time data streaming service to collect cable system data (e.g., from cable head-ends, nodes, consumer premises equipment, etc.), such as service call event volume, throughput, device connections/disconnections, signal strength, signal noise, packet error rate, bandwidth, and the like for DOCSIS networks (e.g., using hybrid fiber-coaxial infrastructure). The cloud-based system may include a step function to map active outage events from the outage stream management component to custom core ticketing logic. Based on queued messages (e.g., with event ticket data) generated by the step function, a hybrid fiber-coaxial (HFC) serverless computing instance may be instantiated, and may determine (e.g., using machine learning as described further herein) whether to suppress event data or provide the event data to another system for further analysis and possible deployment of service technicians. The step function may use state machines to execute tasks (e.g., a state of the state machine may refer to a task), and the tasks may be executed using one or multiple serverless computing instances in a set order, allowing for a mapping between active outage events from the outage stream management component to custom core ticketing logic.

In one or more embodiments, one or more computing instances may be instantiated based on the ingestion of the data via the real-time data streaming service, and may generate service event data based on whether the cable system data meets certain criteria (e.g., when a call volume significantly deviates from an expected call volume at a particular time, a customer service call model to detect when a significant number of customers within a geographic area make customer service calls at a particular time, a modem-based detection model to detect when a percentage of modems lose a connection, whether one or more events have persisted for a period of time exceeding a threshold amount of time, and the like). The outage stream management component may be instantiated based on the generated tickets, which may determine whether the event data satisfies certain criteria (e.g., a threshold number of events, a duration of time that the event has persisted, etc.), which may result in execution of the step function. Based on the message queue resulting from the step function, the HFC serverless computing instance may be instantiated to analyze the service event data and determine whether any of the service event data indicate events that are actionable and should be sent to a network operations center (NOC) or an outside plant (OSP) for further analysis and possible deployment of a human technician, or whether to suppress the ticket. The use of event-based computing instances for the outage stream management component provides an improvement to the way that computer-based systems manage cable system event data, such as avoiding the need to manage servers and automatically scaling based on the amount of data ingested at a given time.

In one or more embodiments, to determine whether any of the service tickets are actionable and should be sent to a NOC or an OSP, or whether to suppress a service ticket, the outage stream management component may identify multiple events (e.g., performance data anomalies) in a particular geographic region. Such events may be related to one another, and may be related to a non-actionable event (e.g., a power outage in the geographic region). For example, an anomalous event indicated by the service tickets analyzed by the outage stream management component may include a breach of a service call volume threshold (e.g., a number of customer service calls reporting service outages exceeding a call volume threshold), or a number of offline cable system devices being offline, such as customer premises equipment (CPE), within a given time period. An event may be planned, such as a temporary service disconnection for repairs, but when multiple events occur during a same time period, such may be an indication that the events are related to a non-actionable cause, such as a power outage. For example, the probability of a certain type of outage may be estimated based on historical performance data, perhaps at 1% or some other number, so the probability that multiple outages with individual occurrence probabilities of 1% occurring simultaneously may be very low (e.g., 1%×1%×1%, etc.), indicating that an anomaly is occurring.

In one or more embodiments, the outage stream management component may use flags to indicate whether a planned event is occurring, whether a service technician is on-site to address an outage reported by a ticket, etc., and when the outage stream management component identifies a ticket that indicates that an event is occurring in an area affected by the planned event or that is already being addressed, the outage stream management component may suppress such a ticket. When the ticket indicates an event that is occurring simultaneously with one or more other events indicated by other service tickets, are within a same geographic area (e.g., serviced by one or more system nodes, within an area code or zip code, etc.), and no flag or other indicator suggests that the events are related to a planned event or already are being addressed by a service technician, such may indicate that the simultaneous events may require further analysis (e.g., by a NOC or OSP). In this manner, the outage stream management component may reduce the human resources required to analyze and triage a detected cable system event, and provides an improvement to the way that computers detect actionable cable system events.

In one or more embodiments, the outage stream management component may determine whether an event is already being evaluated (e.g., by a NOC, OSP, service technician, etc.), or whether an event is likely caused by a planned outage (e.g., planned by a cable service provider), as such may result in the outage stream management component suppressing the event data (e.g., refraining from forwarding a ticket to a NOC or OSP). In this manner, the outage stream management component may facilitate a determination of whether an event is likely to correspond to a planned event, and if not, whether the event may merit additional analysis. In particular, mapped event data from the outage stream manager (e.g., mapped by the step function) may be input into a machine learning model, as described further herein, to generate a confidence score indicating the likelihood of the event data being indicative of an actionable event.

In one or more embodiments, the outage stream management component may wait for a time (e.g., a "soak" or "delay" time) to identify related outage events that have not been resolved during the delay time. In this manner, the outage stream management component may suppress the data of a service ticket for a period of time, and may extend the amount of time that data is suppressed until the cable system determines that the confidence score of an event is high enough to indicate a likelihood of an actionable event occurring. Many detected outage events may resolve before the delay time expires. As a result, the system may avoid generating service tickets for such events, and may issue service tickets for events that persist beyond the delay time. This process may be referred to as "soaking." The delay time may have a definitive start time and end time. The start time may represent a time at which a service outage is detected using an outage detection model. Once a service outage is detected, the system may set the delay time and determine whether any other outages are detected by any of the outage detection models during the delay time. Any outage detected during the delay time, detected using any outage performance criteria, that persists after expiration of the delay time may result in generation of a service ticket (e.g., indicating the service outage type, location, data used to identify the outage, etc.), and any detected outages resolved before expiration of the delay time may be discarded without generating a corresponding service ticket.

In one or more embodiments, outage detection systems of the cable system may use convolutional neural networks or other machine learning trained on some initial training data that may include cable system outage detection criteria. The outage detection systems may adjust the cable system outage detection criteria based on the training data and any machine learning that may identify when performance of the system is indicative of or not indicative of an actual service outage.

In one or more embodiments, the cable system may use convolutional neural networks or other machine learning trained on some initial training data that may include cable system outage detection criteria, allowing the cable system to determine a confidence level, using the outage stream management component, that an event is occurring and is actionable. A machine learning model of the system receives the system performance data (e.g., from the real-time data streaming service), along with training data that indicates whether the system performance data indicates an actionable event, and the model retrains itself based on adjusted thresholds (e.g., call volume thresholds, offline device thresholds, event duration thresholds, etc.) learned from outputted confidence levels and operator feedback.

In one or more embodiments, the machine learning model may be a gradient boosting machine learning model that learns from generated logs (e.g., event logs indicating whether performance data is indicative of an actionable event). For example, the model may use volume bands (e.g., low, medium, high) for specific geographic regions to determine the probabilistic (e.g., confidence) score indicating whether an event is actionable. When an event volume is higher and for longer periods of time, such may indicate a likelihood of an actionable event. In this manner, the outage stream management component may evaluate whether event data has been identified previously, whether the previously identified event data indicated an actionable event, whether any flags indicate a planned outage and/or an existing service technician response, and may determine, based on such information, a confidence score indicating the likelihood that event data indicates an actionable event that may require further analysis and/or a response. When an event pattern has resulted in actionable events in the past and has resulted in a favorable outcome (e.g., fixing an outage), the event pattern may be weighted higher, and newly ingested event data that matches the previous event pattern is more likely to indicate an actionable event, for example, and when no flags indicate a planned outage and/or an existing service technician response, the confidence score may be high enough to result in the cable system forwarding the event data to a NOC or OSP. When the system has determined that an event pattern was actionable, and learned later (e.g., via user feedback) that the event was not actionable, then an event pattern may be weighted lower, causing the confidence score of newly ingested data matching the event pattern to be lower.

In one or more embodiments, the data analyzed by the cable system may be unbalanced in that there may be significantly more non-actionable event data than actionable event data. The unbalanced data set may result in a machine learning problem that may be resolved by synthetic oversampling of the dataset using a nearest-neighbor technique (e.g., in which the distance from one data point to another is measured using a data point's nearest neighbor data point). When two events are too near to each other (e.g., within a threshold distance), the cable system may eliminate the two events. The use of oversampling in combination with the gradient boosting machine learning model may improve the confidence score and allows the machine learning model to learn using an unbalanced dataset.

In one or more embodiments, the cable system may use the cloud-based step function to map active outage events from the outage stream management component to custom core ticketing logic, which integrates with NOCs, OSPs, and other systems and components. The step function may be a serverless function allowing for execution of a sequence of serverless computing instances. A queue (e.g., a message queue) receive the tickets from the step function, and may cause instantiation of a hybrid fiber-coaxial (HFC) serverless computing instance that may provide the event data from the tickets to the machine learning model for analysis and generation of a confidence score for respective event data. Based on the confidence score, the cable system may determine whether to provide a ticket to a NOC or OSP, or whether to suppress the event data. The step function may be triggered by an event detected by the outage stream management component, and may use a graph database service to query data (e.g., including a site/location, a system node, an outage start time, an outage end time, and an actionable/non-actionable decision) to identify service call activity, and may generate service tickets at the node level. Based on the available data and the confidence score, the cable system may determine whether to provide a ticket to a NOC or OSP, or whether to suppress the event data.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates an example system 100 for network outage management, in accordance with one or more example embodiments of the present disclosure.

Referring to FIG. 1, the system 100 may include head-ends 101 (e.g., head-end 102, head-end 104), which may refer to a facility and/or devices for receiving and processing signals, and distributing content (e.g., television content) to nodes (e.g., hybrid fiber-coaxial-HFC-nodes such as node 106, node 108, node 110, node 112), and ultimately to CPE of customer homes (e.g., home 114 with CPE 115 serviced by node 106, home 116 with CPE 117 serviced by node 106, home 118 with CPE 119 serviced by node 108, home 120 with CPE 121 serviced by node 108, home 122 with CPE 123 serviced by node 110, home 124 with CPE 125 serviced by node 110, home 126 with CPE 127 serviced by node 112, home 128 with CPE 129 serviced by node 112). The nodes may include taps, amplifiers, splitters, and the like to receive signals from the head-ends, and to provide content in the form of signals to the CPE of many homes. The nodes may collect metrics for the respectively serviced CPE, and may provide the metrics to the head-ends and/or to outage management system 150, which may be implemented in a head-end or in a remote device (e.g., a service center, a cloud-based environment, or the like).

Still referring to FIG. 1, the outage management system 150 may include or have access to outage detection systems 152 (e.g., outage detection system 1—outage detection system N), any of which may detect system outages at the CPE level, node level, head-end level, or the like. For example, the detection systems 152 may implement different models that identify data anomalies (e.g., indicative of service outages), such as a call-based detection model to detect when a call volume significantly deviates from an expected call volume at a particular time, a customer service call model to detect when a significant number of customers within a geographic area make customer service calls at a particular time, a modem-based detection model to detect when a percentage of modems lose a connection, and the like. The detection systems 152 may output respective data indicative of the occurrence of outage events (e.g., because respective cable system outage criteria is or is not satisfied), a time when the outage events occur, and a location of the outage events (e.g., a customer address, a node, a head-end, etc.).

Still referring to FIG. 1, the outage management system 150 may ingest output (e.g., outage) data at block 154 from the models used by the detection systems 152, which may include some indicator of the location of detected events, the times when the events started, and the times when the events ended. At block 156, the outage management system 150 may generate, based on the data, confidence scores (e.g., using a combination of computing instances, step functions, and machine learning as described herein) indicating probabilities that any event indicated by the event data is actionable (e.g., may be repaired by a service technician). The outage management system 150 may compare any score to a score threshold, and when a score exceeds the threshold, the score may indicate that a cable system outage event is occurring and may be repaired by a service technician. At block 158, the outage management system 150 may send or suppress service tickets with the event data based on whether a confidence score for an identified event exceeds or fails to exceed a score threshold. For example, the outage management system 150 may suppress event data that is unlikely to be actionable, and may send event data to a NOC 180 and/or an OSP 184 when the event data indicates an event that is likely to be actionable. In this manner, the outage management system 150 may evaluate the data and determine whether the data indicates an outage that is actionable (e.g., repairable by a service technician) or non-actionable (e.g., is already being repaired, is associated with a planned outage, is due to a power outage or another event that cannot be repaired by a cable provider).

In one or more embodiments, system outages may occur at many locations. For example, an outage may be system-wide, market-wide, or at the node level. In particular, MSOs and other service providers may provide service to a variety of CPE, where many CPE may be in communication with a respective node (e.g., the node 106), and the system 100 may include many nodes. For example, a node may provide service to all the CPE of a neighborhood. Fiber optics and other connections (e.g., connections 170) may deliver data to one or more nodes, and coaxial cable or other connections (e.g., connections 172) may deliver the data the "last mile" from the nodes to the CPE. Most system outages may occur at the node level. The connections 170 may include wired and/or wireless connections according to DOCSIS, optical connections, and the like.

Because the different outage detection systems 152 may detect varying data anomalies at different nodes, sometimes service outages at different CPE at one node or across multiple nodes may be related. For example, a service outage that affects CPE serviced by the node 106 also may affect CPE serviced by the node 108 and/or any other nodes (e.g., the outages at different nodes may be related, such as caused by the connections 170, the headend 102 and/or the headend 104, etc.).

In one or more embodiments, the outage detection systems 152 may include devices, systems, modules, and the like for analyzing data collected from the CPE, the nodes, and/or the head-ends (e.g., using wired and/or wireless connections). The outage detection systems 152 may determine cable system outage detection criteria. For example, the outage detection systems 152 may use convolutional neural networks or other machine learning trained on some initial training data that may include cable system outage detection criteria. The outage detection systems 152 may adjust the cable system outage detection criteria based on the training data and any machine learning that may identify when performance of the system 100 is indicative of or not indicative of an actual service outage. For example, the outage detection systems 152 may adjust the thresholds shown in FIGS. 2A and 2B using machine learning over time.

Figure 2A:
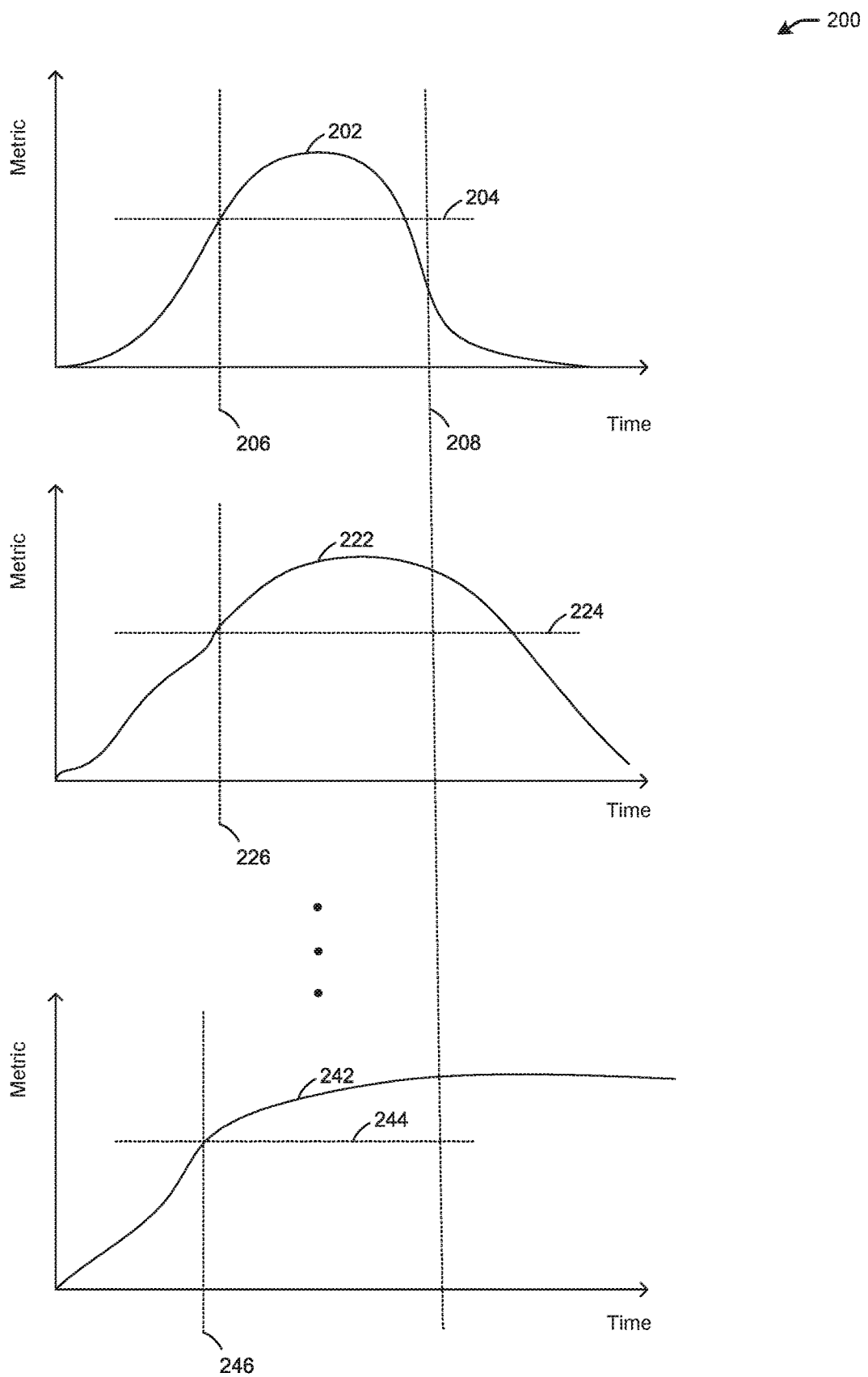
FIG. 2A illustrates example graphs of metrics evaluated by the outage detection systems of FIG. 1, in accordance with one or more embodiments of the present disclosure.

FIG. 2A illustrates example graphs 200 of metrics evaluated by the outage detection systems 152 of FIG. 1, in accordance with one or more embodiments of the present disclosure.

Referring to FIG. 2A, multiple graphs are shown, representing a variety of performance metrics monitored for the system 100 of FIG. 1. For example, the metrics may include call volume, number or percentage of CPE whose connections have been lost during a time period, number or percentage of nodes whose connections have been lost during a time period, or the like. The graphs shown in FIG. 2A represent cable system outages when the metrics are above a threshold value.

As shown, a metric 202 may exceed a threshold value 204 at time 206 and returned below the threshold value 204 by time 208, indicating a service outage began at time 206.

Metric 222 may exceed a threshold value 224 at time 226 and did not return below the threshold value 224 by the time 208, indicating a service outage began at time 226 that was not resolved by the time 208. Metric 242 may exceed a threshold value 244 at time 246 and may not return below the threshold value 244 by the time 208. The individual models used by the outage detection systems 152 of FIG. 1 may cause generation of separate service tickets for the three scenarios: One when the metric 202 exceeds the threshold value 204, one when the metric 222 exceeds the threshold value 224, and one when the metric 242 exceeds the threshold value 244. However, the outage management system 150 of FIG. 1 may set and use a delay time to determine if any of the metrics still exceed their respective threshold values (the same or different values) after the delay time. For example, the outage management system 150 may determine that the metric 202 exceeds the threshold value 204 at the time 206, and may set the time 208 so that the delay time is the time period between the time 206 and the time 208. The time 208 (e.g., the delay time) may be set intuitively or may be learned (e.g., as explained with respect to FIG. 2C). The outage management system 150 may determine that the metric 222 exceeds the threshold value 204 at the time 226, and that the metric 242 exceeds the threshold value 244, but that the metric 222 and the metric 242 persist above the threshold value 224 and the threshold value 244, respectively, beyond the time 208 (e.g., the delay time). Because the metric 202 does not persist above the threshold value 224 beyond the delay time (e.g., time 208), the outage management system 150 may discard the metric 202 and refrain from including the metric 202 in a service ticket for an outage during the delay time. Because the metrics 222 and 242 persist above their respective threshold values beyond the delay time, the outage management system 150 may generate a single service ticket that indicates metrics 222 and 242 during the delay time.

Figure 2B:
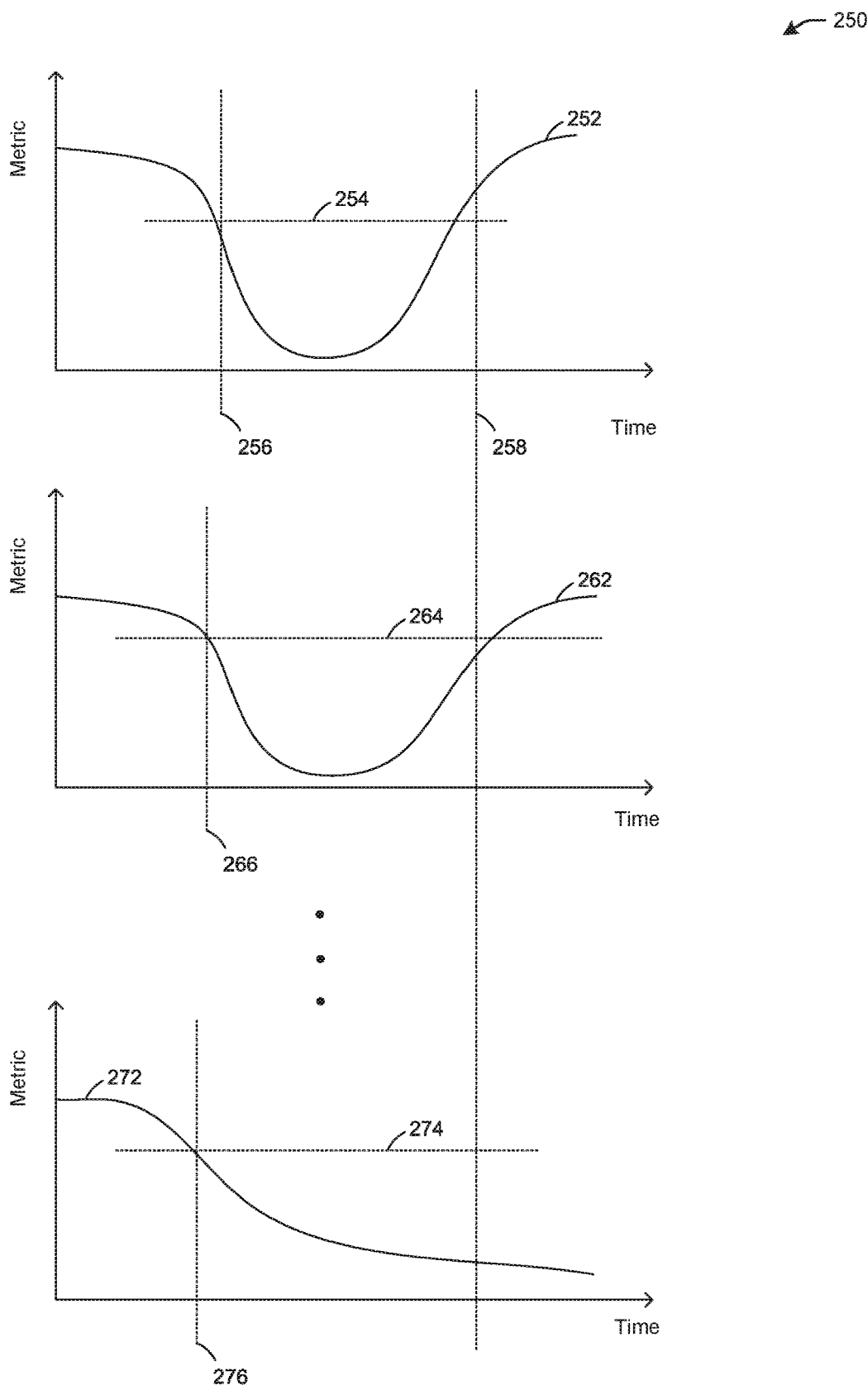
FIG. 2B illustrates example graphs of metrics evaluated by the outage detection systems of FIG. 1, in accordance with one or more embodiments of the present disclosure.

FIG. 2B illustrates example graphs 250 of metrics evaluated by the outage detection systems 152 of FIG. 1, in accordance with one or more embodiments of the present disclosure.

Referring to FIG. 2B, multiple graphs are shown, representing a variety of performance metrics monitored for the system 100 of FIG. 1. For example, the metrics may include call volume, number or percentage of CPE whose connections have been lost during a time period, number or percentage of nodes whose connections have been lost during a time period, or the like. The graphs shown in FIG. 2B represent cable system outages when the metrics are below a threshold value.

As shown, a metric 252 may fall below a threshold value 254 at time 256 and returned above the threshold value 204 by time 258, indicating a service outage began at time 256. Metric 262 may exceed a threshold value 264 at time 266 and did not return above the threshold value 264 by the time 258, indicating a service outage began at time 266 that was not resolved by the time 268. Metric 272 may fall below a threshold value 274 at time 276 and may not return above the threshold value 274 by the time 278. The individual models used by the outage detection systems 152 of FIG. 1 may cause generation of separate service tickets for the three scenarios: One when the metric 252 falls below the threshold value 254, one when the metric 262 exceeds the threshold value 264, and one when the metric 272 exceeds the threshold value 274. However, the outage management system 150 of FIG. 1 may set and use a delay time to determine if any of the metrics still exceed their respective threshold values (the same or different values) after the delay time. For example, the outage management system 150 may determine that the metric 252 exceeds the threshold value 254 at the time 256, and may set the time 258 so that the delay time is the time period between the time 256 and the time 258. The time 258 (e.g., the delay time) may be set intuitively or may be learned (e.g., as explained with respect to FIG. 2C). The outage management system 150 may determine that the metric 262 is below the threshold value 264 at the time 266, and that the metric 272 is below the threshold value 274, but that the metric 262 and the metric 272 persist below the threshold value 264 and the threshold value 274, respectively, beyond the time 258 (e.g., the delay time). Because the metric 252 does not persist below the threshold value 254 beyond the delay time (e.g., time 258), the outage management system 150 may discard the metric 252 and refrain from including the metric 252 in a service ticket for an outage during the delay time. Because the metrics 262 and 272 persist below their respective threshold values beyond the delay time, the outage management system 150 may generate a single service ticket that indicates metrics 262 and 272 during the delay time.

Referring to FIGS. 2A and 2B, the start times (e.g., time 206, time 226, and 246 in FIG. 2A, and time 256, time 266, and time 276 in FIG. 2B) may be the same or within a threshold amount of time from one another. In this manner, when the outage management system 150 identifies a metric that is above or below a threshold value (e.g., based on analysis from the outage detection systems 152), the outage management system 150 may evaluate other metrics to determine when any of the metrics indicate an outage during the delay time. The outage management system 150 may use machine learning (e.g., convolutional neural networks, etc.) to determine the delay time based on initial training data that sets a delay time, and may adjust the delay times (e.g., based on a learned time period after which a threshold percentage of detected outage events based on the threshold values resolve, as described further with respect to FIG. 2C).

In one or more embodiments, the metrics shown in FIGS. 2A and 2B may be for a single node or across multiple nodes. In this manner, when the outage management system 150 detects a metric above or below a threshold value (e.g., as indicated by the outage systems 152), the outage management system 150 may determine if any other metrics at a same or different node indicate an outage, and whether any outage lasts beyond the delay time. When outages indicated by the different metrics occur during and persist longer than the delay time, such may indicate that the outages, whether at a same node or across different nodes, are related.

Figure 2C:
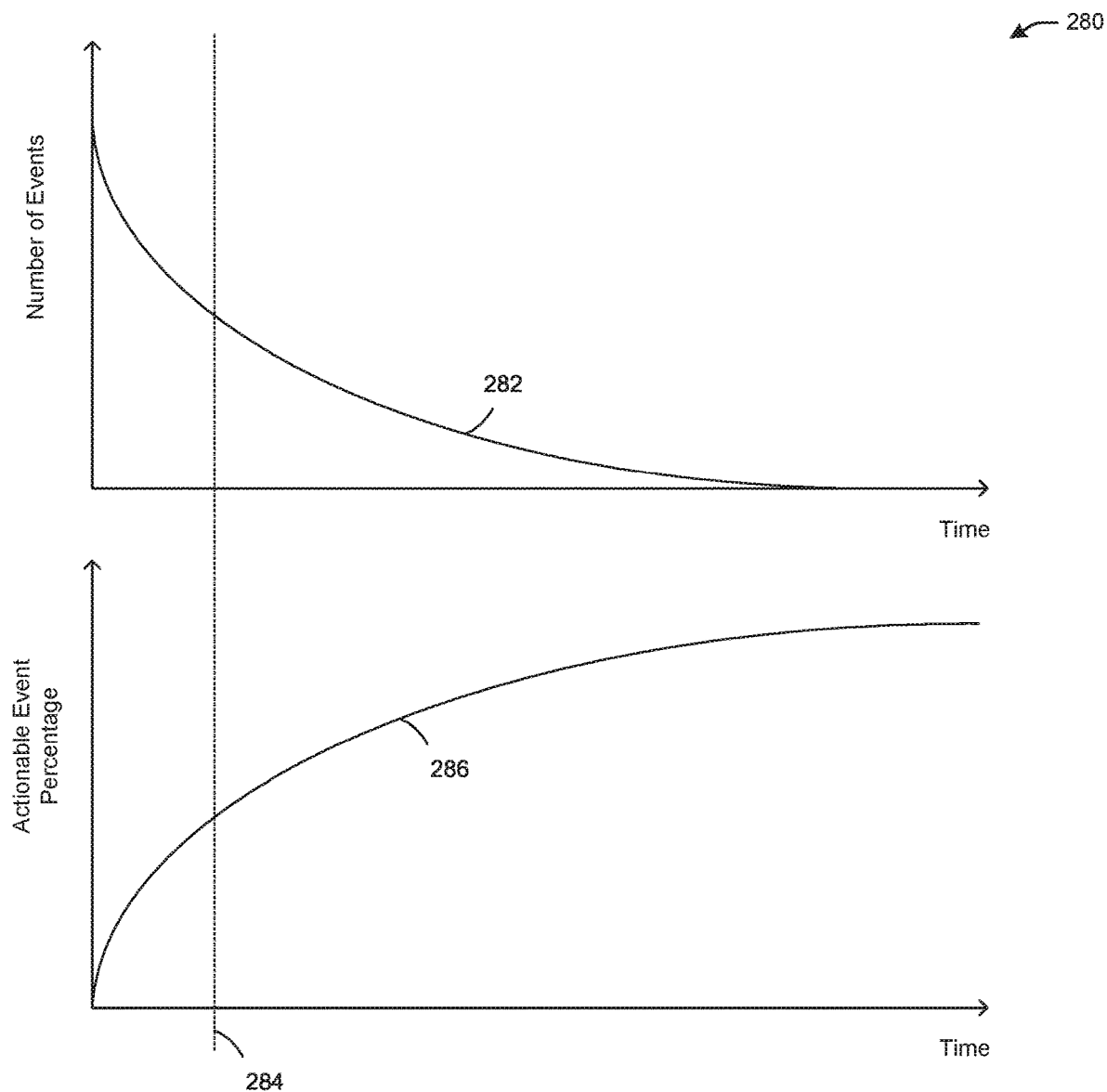
FIG. 2C illustrates example graphs of actionable system outage events over time, in accordance with one or more example embodiments of the present disclosure.

FIG. 2C illustrates example graphs 280 of actionable system outage events over time, in accordance with one or more example embodiments of the present disclosure.

Referring to FIG. 2C, the graphs 280 show that a number of events 282 at a given time (e.g., time zero) decreases as the events 282 are resolved. For example, a number of disconnected devices may be higher at time zero than at time 284 because some of the disconnected devices may reconnect (e.g., CPE to a node, nodes to a headend, etc.) between time zero and the time 284. Prior to the time 284, an actionable event percentage 286 may be low even when the number of events 282 is high. Therefore, suppressing events lasting shorter than the time 284 may result in filtering out of transient events that may not be addressable by a service center, for example. The outage management system 150 of FIG. 1 may determine the time 284 when the number of events 282 (e.g., actionable events detected using any of the models of the outage detection systems 152 of FIG. 1) may drop below a threshold percentage. In this manner, as the number of events 282 changes over time, so too may the time 284. The time 284 may represent the delay time for FIGS. 2A and 2B (e.g., the time 208 of FIG. 2A may be the time 206 plus the time 284, and the time 258 of FIG. 2B may be the time 256 plus the time 284). The time 284 may be used as a delay time to allow the percentage of the actionable events 286 to resolve (e.g., no longer be actionable because their metrics of FIGS. 2A and 2B have returned below or above threshold values) by the expiration of the time 284 from the start time when the events became actionable (e.g., the time 206 of FIG. 2A, the time 256 of FIG. 2B).

In one or more embodiments, the time 284 may be set and/or adjusted over time. The adjustment may be manual, automatic, or learned (e.g., using machine learning). For example, the outage management system 150 may learn when the number of events 282 over time drop below a threshold percentage, and may adjust the delay time accordingly for determining which service outages are to be included in service tickets or discarded (e.g., for resolving before expiration of the delay time).

In one or more embodiments, the graphs 280 may represent the number of events 282 and the percentage of actionable events 286 at a given node or across multiple nodes.

Figure 3:
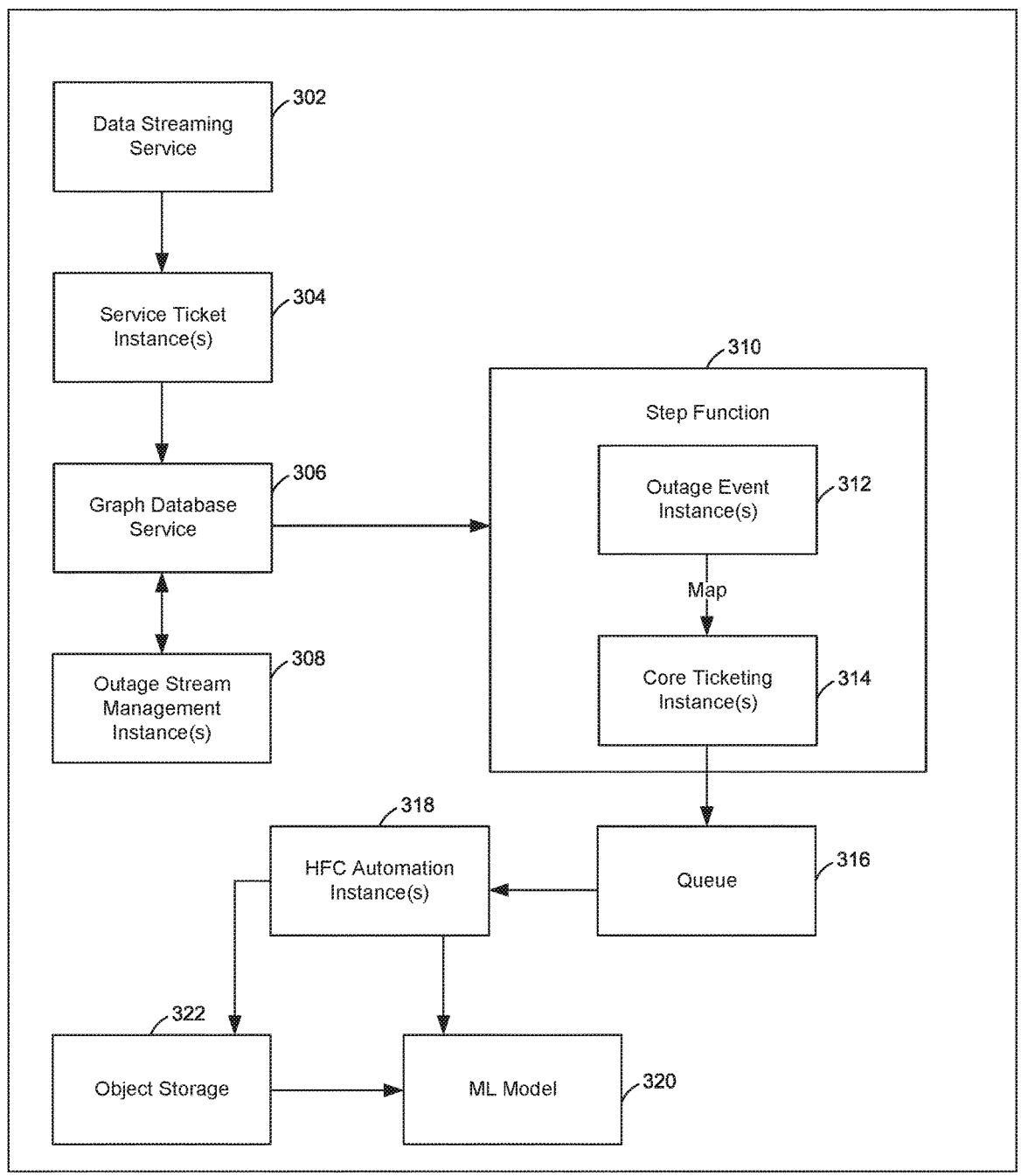
FIG. 3 illustrates an example schematic diagram of the outage management system of the system of FIG. 1, in accordance with one or more example embodiments of the present disclosure.

FIG. 3 illustrates an example schematic diagram of the outage management system 150 of the system 100 of FIG. 1, in accordance with one or more example embodiments of the present disclosure.

Referring to FIG. 3, the outage management system 150 may refer to one or more cloud-based devices, and may include a data streaming service 302 (e.g., to collect cable system data from cable head-ends, nodes, consumer premises equipment, etc.), one or more service ticket instances 304 (e.g., serverless computing instances instantiated based on the receipt of the event data using the data streaming service 302), which generates event data to be compared to graph data using a graph database service 306 (e.g., a graph database service to query data, including a site/location, a system node, an outage start time, an outage end time, and an actionable/non-actionable decision). One or more outage stream management instances 308 of the outage management system 150 may be instantiated based on the generation of the event data by the one or more service ticket instances, and may identify service call activity from the graph data provided by the graph database service 306 (e.g., to determine if an event is related to a planned outage in a same geographic area based on a head-end or node, to determine if an outage at a same node or head-end is being addressed by a service technician, to determine whether a known power outage has occurred in a geographic area where the event data occurred, etc.).

Still referring to FIG. 3, the outage management system 150 may include a step function 310 (e.g., state machine for performing tasks of one or multiple serverless computing instances). The step function 310 may map outage event data of one or more instantiated outage event instances to one or more core ticketing service instances 314. The event data may be added to a messaging queue 316, and one or more HFC automation instances 318 may be instantiated based on the event data to provide the event data to a machine learning (ML) model 320, which may generate a confidence score indicating whether any event data indicates that an event is occurring and is actionable (e.g., based on the event data, and on training/re-training data provided by object storage 322). In this manner, the outage management system 150 may compare the confidence scores of any detected event to a score threshold, and when the confidence score exceeds the score threshold, the outage management system 150 may send a service ticket with the event data to another system (e.g., the NOC 180 and/or the OSP 184 of FIG. 1).

Figure 4:
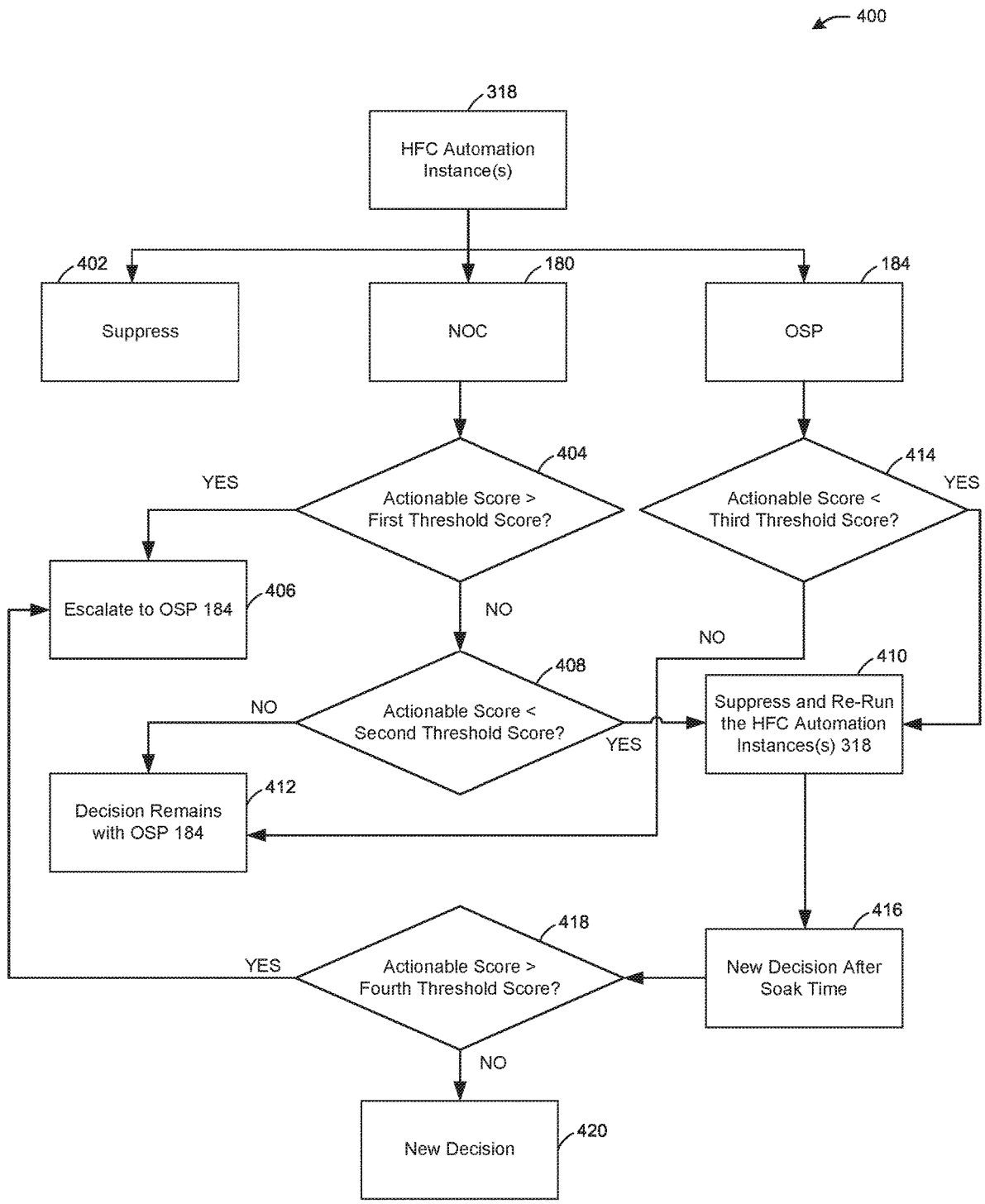
FIG. 4 illustrates a flow diagram of an illustrative process for network outage management, in accordance with one or more example embodiments of the present disclosure.

FIG. 4 illustrates a flow diagram of an illustrative process 400 for network outage management, in accordance with one or more example embodiments of the present disclosure.

Referring to FIG. 4, the process 400 may use the one or more HFC automation instances 318 of FIG. 3, the NOC 180 of FIG. 1, and the OSP 184 of FIG. 1. As shown in FIG. 4, the HFC automation instances 318 may suppress event data at block 402 when the confidence score of a detected outage event is low (e.g., below a threshold score), or may send the event data (e.g., using a service ticket) to the NOC 180 or the OSP 184 for further analysis. The NOC 180 may, at block 404, determine whether the actionable score (e.g., confidence score) of the event data is greater than a first threshold value (e.g., indicating a high likelihood of a technician being able to resolve the outage). When the actionable score is greater than the first threshold, the process 400 may continue at block 406, where the event data may be escalated to the OSP 184 for further processing. When the actionable score is less than the first threshold, the process 400 may continue at block 408, where the NOC may determine whether the actionable score is below a second threshold (e.g., indicating a low likelihood of a technician being able to resolve the outage). When the actionable score is below the second threshold at block 408, the process 400 may continue at block 410, where the OSP 184 may suppress the event data and may re-run the one or more HFC automation instances 318 after a period of time expires (e.g., a soak time). When the actionable score is above the second threshold at block 408, the process 400 may continue at block 412, where the decision of what to do with the event data (e.g., dispatch a technician) remains with the OSP 184.

Still referring to FIG. 4, the OSP 184 at block 414 may determine whether the actionable score of the event data is less than a third threshold value. When the actionable score of the event data is less than a third threshold value, the process 400 may continue at block 410, and when the actionable score of the event data is greater than the third threshold value, the process 400 may continue at block 412. After waiting a soak time at block 410, the process 400 may continue at block 416, where a new decision may be rendered by the one or more HFC automation instances 318 (e.g., based on whether the outage indicated by the event is still occurring and/or is still related to an on-going repair, planned outage, or unplanned outage). At block 418, the process 400 may determine whether the actionable score, as generated by re-running the one or more HFC automation instances 318 at block 410, exceeds a fourth threshold score. If yes, the process 400 may continue to block 406. If no, the process 400 may continue to block 420, where a new decision may be rendered regarding whether or not to suppress the event data or generate a service ticket for a service technician.

Figure 5:
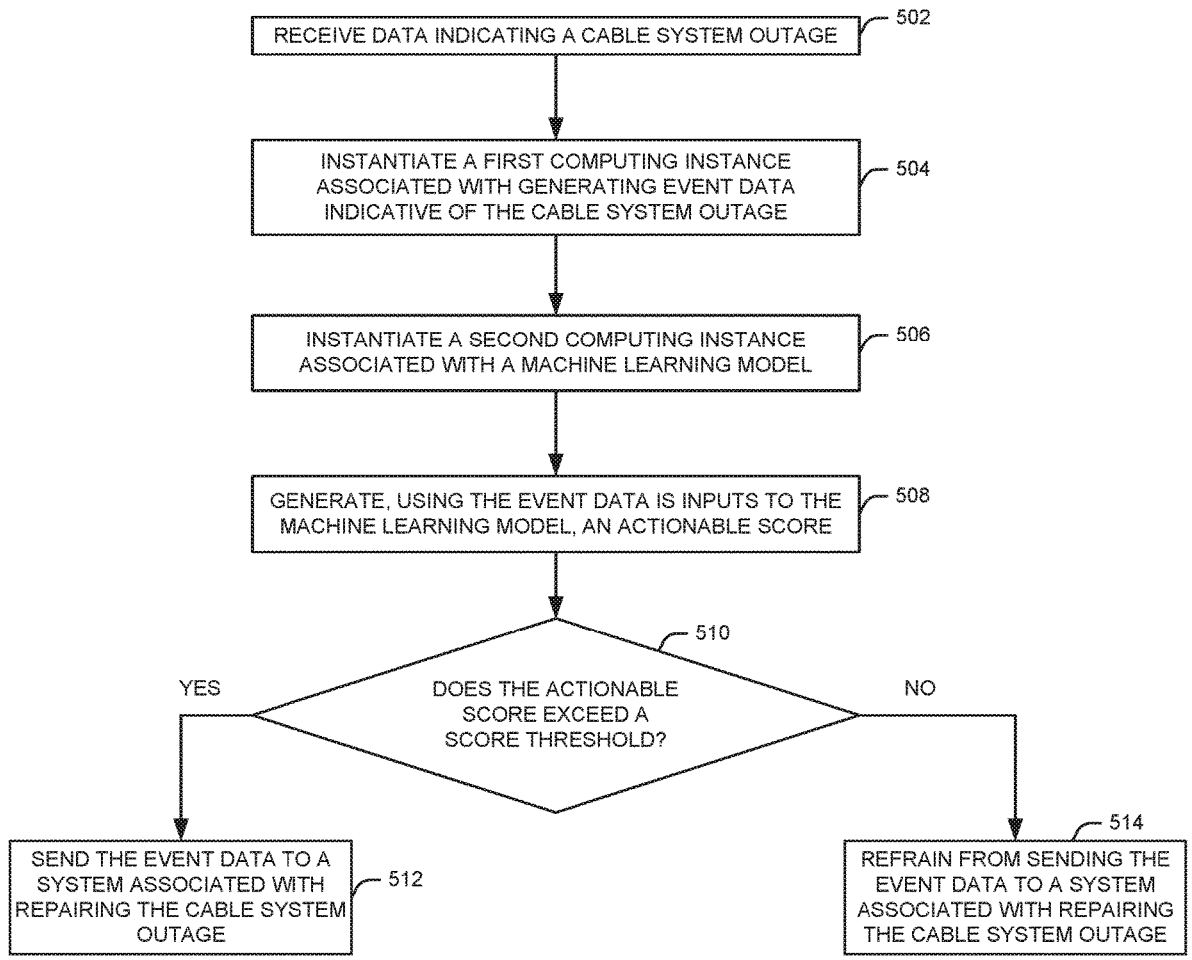
FIG. 5 illustrates a flow diagram of an illustrative process for network outage management, in accordance with one or more example embodiments of the present disclosure.

FIG. 5 illustrates a flow diagram of an illustrative process 500 for network outage management, in accordance with one or more example embodiments of the present disclosure.

At block 502, a system (or device, e.g., the outage management system 150 of FIG. 1) may receive performance data for a cable system (e.g., the system 100 of FIG. 1). The system may include a real-time data streaming service (e.g., the data streaming service 302 of FIG. 3) to collect cable system data (e.g., from cable head-ends, nodes, consumer premises equipment, etc.), such as service call event volume, throughput, device connections/disconnections, signal strength, signal noise, packet error rate, bandwidth, and the like for DOCSIS networks (e.g., using hybrid fiber-coaxial infrastructure).

At block 504, the system may instantiate, based on the receipt of the performance data, a first computing instance (e.g., the one or more outage stream management instances 308 of FIG. 3) associated with generating event data indicative of a cable system outage indicated by the performance data. Using a graph database service (e.g., the graph database service 306 of FIG. 3), the first computing instance may identify flags that indicate whether a planned event is occurring, whether a service technician is on-site to address an outage reported by a ticket, etc. When the ticket indicates an event that is occurring simultaneously with one or more other events indicated by other service tickets, are within a same geographic area (e.g., serviced by one or more system nodes, within an area code or zip code, etc.), and no flag or other indicator suggests that the events are related to a planned event or already are being addressed by a service technician, such may indicate that the simultaneous events may require further analysis (e.g., by a NOC or OSP).

At block 506, the system may instantiate a second computing instance (e.g., the one or more HFC automation instances 318 of FIG. 3) associated with calling a machine learning model (e.g., the ML model 320 of FIG. 3). The system may use a step function to map a third computing instance (e.g., the one or more outage event instances 312 of FIG. 3) to one or more fourth computing instances associated with generating service tickets that provide the event data to a service technician, for example. When the event data is queued in a message, the second computing instance may be instantiated, and may call the ML model as a task.

At block 508, the system may generate, using the event data as inputs to the ML model, an actionable score (e.g., confidence score) for the outage event indicated by the event data. The actionable score may indicate a probability that the event data is indicative of an actionable event (e.g., an outage event that can be repaired by a service technician), in contrast with a non-actionable event, such as an event caused by a power outage or other scenario that is not controlled by a cable service provider. The ML model may be a gradient boosting model that may be trained by unbalanced data, and may retrain itself based on adjusted thresholds (e.g., call volume thresholds, offline device thresholds, event duration thresholds, etc.) learned from outputted confidence levels and operator feedback.

At block 510, the system may determine whether the actionable score exceeds a score threshold. The score threshold may be determined and adjusted by the system. When the actionable score exceeds the score threshold, such may indicate that the outage event is actionable and may warrant further processing (e.g., by a NOC or OSP). When the actionable score exceeds the score threshold, the process 500 may continue to block 512, where the system may provide the event data for the outage event to an OSP or NOC, which may perform further analysis (e.g., FIG. 4). When the actionable score does not exceed the score threshold, indicating a non-actionable event, the process 500 may continue to block 514, where the system may suppress the event data (e.g., refrain from sending the event data to the OSP or NOC). Optionally, the system may soak the event data and re-run the process 500.

It is understood that the above descriptions are for purposes of illustration and are not meant to be limiting.

Figure 6:
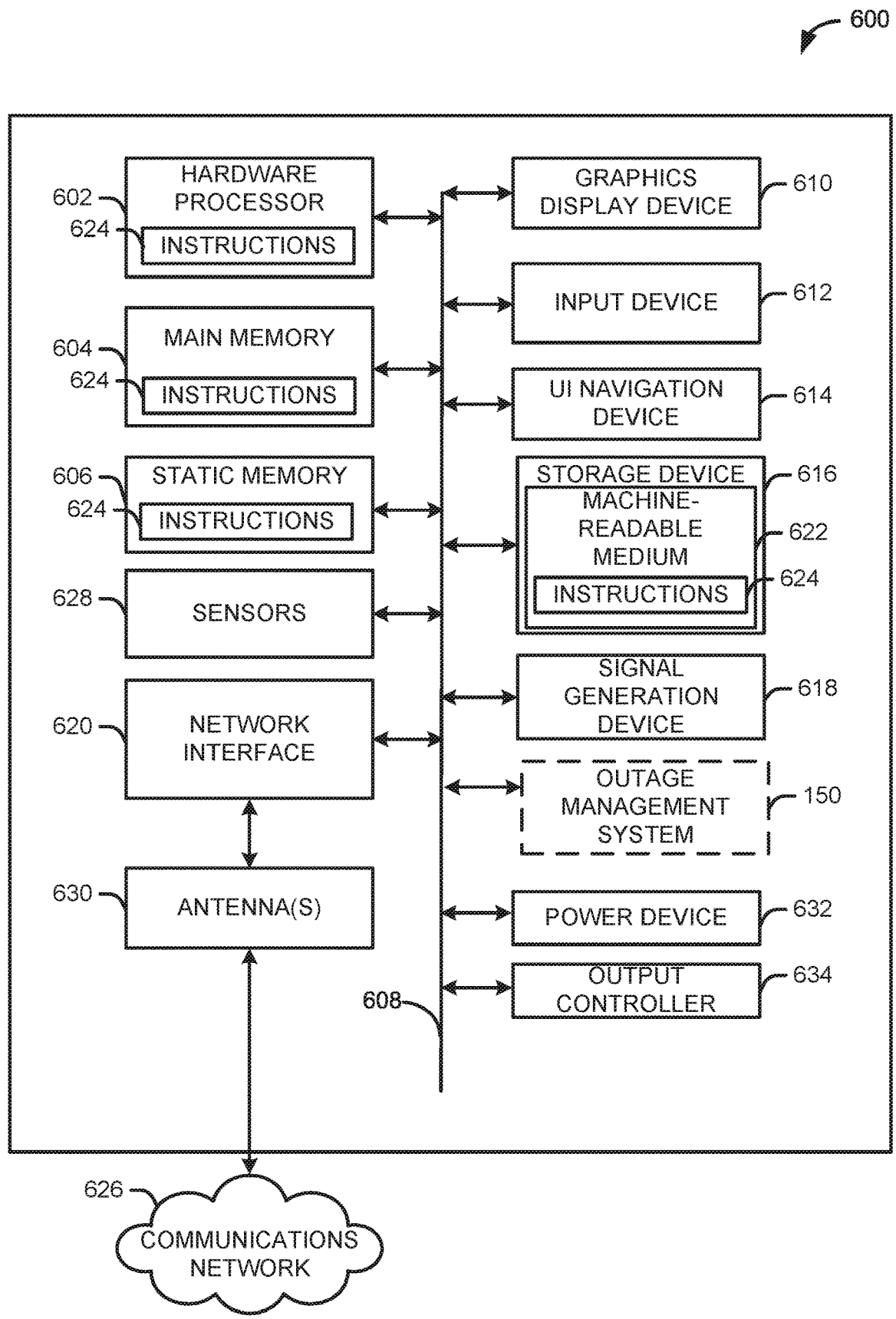
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the outage management system 150 of FIG. 1, the outage detection systems 152 of FIG. 1) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. The machine 600 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include any combination of the illustrated components. For example, the machine 600 may include a hardware processor 602 (e.g., a central processing unit (CPU), a graphics processing unit (GPU), a tensor processing unit (TPU) including an artificial intelligence application-specific integrated circuit (ASIC), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a data signal), the outage management system 150 of FIG. 1, a network interface device/transceiver 620 coupled to antenna(s) 630, and one or more sensors 628. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include DOCSIS, fiber optic, a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cable box, a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method for managing cable network outages, the method comprising:
   receiving, by a system, first data indicative of a first cable system outage;
   instantiating, by the system, based on receiving the first data, a first serverless computing instance that:
      determines that the first data deviate from cable outage criteria;
      generates event data indicative of the first cable system outage based on determining that the first data deviate from the cable outage criteria;
      compares the event data to second data indicative of at least one of a planned cable system outage or a second cable system outage in a same geographic area as the first cable system outage; and
      generates, based on comparing the event data to the second data, a flag indicative of the at least one of the planned cable system outage or the second cable system outage;
   instantiating, by the system, based on generation of the event data, a second serverless computing instance that:
      calls a trained machine learning model that has been re-trained, using performance data indicative of whether previous event data corresponded to actionable outage events, to adjust thresholds or delay times used to determine whether the event data are indicative of actionable events;
      inputs the event data and the flag to the re-trained machine learning model; and
      generates, using the event data and the flag as inputs to the re-trained machine learning model using the adjusted thresholds or delay times, a score indicative of a probability that the first cable system outage is repairable by a technician;
   determining, by the system, that the score is below a score threshold; and
   determining, by the system, based on the score being below the score threshold, not to send the event data to a first system for assigning the technician to repair the first cable system outage.

2. The method of claim 1, wherein the machine learning model comprises a gradient boosting machine learning model.

3. The method of claim 2, further comprising training the machine learning model using an unbalanced dataset, wherein the unbalanced dataset comprises more first event data associated with first cable system outages not repairable by a technician than second event data associated with second cable system outages repairable by a technician.

4. The method of claim 1, wherein the first cable system outage is associated with a Data Over Cable Service Interface Specification (DOCSIS) cable network using hybrid fiber-coaxial communications.

5. The method of claim 1, further comprising:
   receiving, by the system, third data indicative of a second cable system outage;
   instantiating, by the system, based on receiving the third data, a third serverless computing instance that generates second event data indicative of the second cable system outage;
   instantiating, by the system, based on generating the second event data, a fourth serverless computing instance that:
      calls the re-trained machine learning model; and
      generates, using the re-trained machine learning model, based on the second event data, a second score indicative of a second probability that the second cable system outage is repairable by a technician;
   determining, by the system, that the second score exceeds the score threshold; and
   sending, by the system, based on the second score exceeding the score threshold, the second event data to the first system.

6. The method of claim 1, wherein the first serverless computing instance:
   identifies a power outage; and
   determines that the first cable system outage is caused by the power outage; and
   generates a second flag indicating that the first cable system outage is associated with the power outage,
   wherein the score is further based on the second flag.

7. The method of claim 1, wherein the first serverless computing instance determines a duration of the first cable system outage,
   wherein generating the score is further based on the duration.

8. The method of claim 1, further comprising:
   executing, by the system, a step function comprising a state machine that causes the instantiation of the second serverless computing instance based on determining that the first data deviate from the cable outage criteria.

9. A device comprising memory coupled to at least one processor, the at least one processor configured to:
   receive first data indicative of a first cable system outage;
   instantiate, based on receiving the first data, a first serverless computing instance that:
      determines that the first data deviate from cable outage criteria;
      generates event data indicative of the first cable system outage based on determining that the first data deviate from the cable outage criteria;
      compares the event data to second data indicative of at least one of a planned cable system outage or a second cable system outage in a same geographic area as the first cable system outage; and
      generates, based on comparing the event data to the second data, a flag indicative of the at least one of the planned cable system outage or the second cable system outage;
   instantiate, based on generation of the event data, a second serverless computing instance that:
      calls a trained machine learning model that has been re-trained, using performance data indicative of whether previous event data corresponded to actionable outage events, to adjust thresholds or delay times used to determine whether the event data are indicative of actionable events;

inputs the event data and the flag to the re-trained machine learning model;

generates, using the event data and the flag as inputs to the re-trained machine learning model using the adjusted thresholds or delay times, a score indicative of a probability that the first cable system outage is repairable by a technician;

determine that the score is below a score threshold; and determine, based on the score being below the score threshold, not to send the event data to a first system for assigning the technician to repair the first cable system outage.

10. The device of claim 9, wherein the machine learning model comprises a gradient boosting machine learning model.

11. The device of claim 10, wherein the at least one processor is further configured to:

train the machine learning model using an unbalanced dataset, wherein the unbalanced dataset comprises more first event data associated with first cable system outages not repairable by a technician than second event data associated with second cable system outages repairable by a technician.

12. The device of claim 9, wherein the first cable system outage is associated with a Data Over Cable Service Interface Specification (DOCSIS) cable network using hybrid fiber-coaxial communications.

13. The device of claim 9, wherein the at least one processor is further configured to:

receive third data indicative of a second cable system outage;

instantiate, based on receiving the third data, a third serverless computing instance that generates second event data indicative of the second cable system outage;

instantiate, based on generating the second event data, a fourth serverless computing instance that:

calls the re-trained machine learning model; and generates, using the re-trained machine learning model, based on the second event data, a second score indicative of a second probability that the second cable system outage is repairable by a technician;

determine that the second score exceeds the score threshold; and send, based the second score exceeding the score threshold, the second event data to the first system.

14. The device of claim 9, wherein the at least one processor is further configured to:

execute a step function comprising a state machine that causes the instantiation of the second serverless computing instance based on determining that the first data deviate from the cable outage criteria.

15. A system, comprising:

a second system for assigning a technician to repair cable system outages; and memory coupled to at least one processor, the at least one processor configured to:

receive first data indicative of a first cable system outage;

instantiate a first serverless computing instance based on receiving the first data, wherein the first serverless computing instance:

determines that the first data deviate from cable outage criteria;

generates event data indicative of the first cable system outage based on determining that the first data deviate from the cable outage criteria;

compares the event data to second data indicative of at least one of a planned cable system outage or a second cable system outage in a same geographic area as the first cable system outage; and generates, based on comparing the event data to the second data, a flag indicative of the at least one of the planned cable system outage or the second cable system outage;

instantiate a second serverless computing instance instantiated based on generation of the event data, wherein the second serverless computing instance:

calls a trained machine learning model that has been re-trained, using performance data indicative of whether previous event data corresponded to actionable outage events, to adjust thresholds or delay times used to determine whether the event data are indicative of actionable events; and inputs the event data and the flag to the re-trained machine learning model; and the re-trained machine learning model, wherein the re-trained machine learning model receives, based on instantiation of the second serverless computing instance, the event data and the flag as inputs, and generates, using the adjusted thresholds or delay times, a score indicative of a probability that the first cable system outage is repairable by a technician, wherein the at least one processor is further configured to determine not to send, based on the score being below a score threshold, the event data to the second system the first cable system outage.

16. The system of claim 15, wherein the machine learning model comprises a gradient boosting machine learning model.

17. The system of claim 16, wherein the machine learning model is trained using an unbalanced dataset, wherein the unbalanced dataset comprises more first event data associated with first cable system outages not repairable by a technician than second event data associated with second cable system outages repairable by a technician.

18. The system of claim 15, wherein the first cable system outage is associated with a Data Over Cable Service Interface Specification (DOCSIS) cable network using hybrid fiber-coaxial communications.

19. The system of claim 15, wherein the at least one processor is further configured to:

instantiate a third serverless computing instance based on second event data indicative of a second cable system outage, wherein the third serverless computing instance generates second event data indicative of the second cable system outage; and instantiate a fourth serverless computing instance based on generation of the second event data, wherein the fourth serverless computing instance calls the machine learning model, wherein the re-trained machine learning model generates, based on the second event data, a second score indicative of a second probability that the second cable system outage is repairable by a technician, and wherein the system sends, based on the second score exceeding the score threshold, the second event data to the second system.

20. The system of claim 15, wherein the at least one processor is further configured to:
    execute a step function comprising a state machine that causes the instantiation of the second serverless computing instance based on determining that the first data deviate from the cable outage criteria.

\* \* \* \* \*